(12) United States Patent
Kim et al.

(10) Patent No.: US 6,932,115 B2
(45) Date of Patent: Aug. 23, 2005

(54) VALVE APPARATUS FOR HERMETIC COMPRESSOR

(75) Inventors: Tae-Min Kim, Changwon (KR); Hyo-Jae Lee, Changwon (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/489,430

(22) PCT Filed: Sep. 21, 2001

(86) PCT No.: PCT/KR01/01589

§ 371 (c)(1),
(2), (4) Date: Mar. 12, 2004

(87) PCT Pub. No.: WO03/025397

PCT Pub. Date: Mar. 27, 2003

(65) Prior Publication Data

US 2004/0231737 A1 Nov. 25, 2004

(51) Int. Cl.[7] .......................... F16K 15/16; F04B 39/10
(52) U.S. Cl. ..................... 137/857; 137/855; 417/569
(58) Field of Search ............................. 137/855, 856, 137/857; 251/337; 417/569

(56) References Cited

U.S. PATENT DOCUMENTS

| | | | |
|---|---|---|---|
| 1,697,004 A | * | 1/1929 | Gutermuth ............... 137/857 |
| 1,852,033 A | * | 4/1932 | Summers ............... 137/857 |
| 5,562,431 A | * | 10/1996 | Plummer ............... 417/569 |
| 5,609,476 A | | 3/1997 | Kim et al. |
| 5,887,622 A | * | 3/1999 | Ahn ............... 137/856 |

FOREIGN PATENT DOCUMENTS

| | | | |
|---|---|---|---|
| GB | 2245341 A | * | 1/1992 |
| JP | 55046040 A | | 3/1980 |
| JP | 1106982 A | | 4/1989 |
| JP | 1113587 A | | 5/1989 |

* cited by examiner

*Primary Examiner*—Ramesh Krishnamurthy
(74) *Attorney, Agent, or Firm*—Fleshner & Kim LLP

(57) ABSTRACT

The present invention relates to a valve apparatus for a hermetic compressor. In the present invention, an elastic lead (40) is integrally formed with a discharge valve (30) in order to reduce striking force generated when the discharge valve (30) strikes a valve seat (26) and to facilitate opening of the discharge valve (30). The elastic lead (40) is formed by cutting out an intermediate portion of the discharge valve (30), and a free end of the elastic lead is bent to directed to a free end (36) or a clasped portion (32) of the discharge valve (30). The free end (36) of the elastic lead (40) is supported on a bottom surface of a recess (27) in a valve plate (20), and thus, the elastic lead (40) exerts elastic force on the discharge valve (30) in a direction that the discharge valve (30) is opened. According to the present invention constructed as such, noise generated when the discharge valve (30) operates can be minimized, and opening/closing operation of the discharge valve (30) can be smoothly performed.

20 Claims, 5 Drawing Sheets

VALVE APPARATUS FOR HERMETIC COMPRESSOR

TECHNICAL FIELD

The present invention relates to a hermetic compressor, and more particularly, to a valve apparatus for controlling suction and discharge of working fluid into and out of a cylinder of the compressor.

BACKGROUND ART

In a conventional hermetic compressor, a piston linearly reciprocates in a cylinder formed within a cylinder block to compress working fluid. The working fluid can be sucked into and discharged from the cylinder under the control of the valve apparatus.

In general, the valve apparatus is provided on a valve plate which is mounted onto a leading end of the cylinder block to close an interior of the cylinder. A flow passage is formed in the valve plate for communicating the cylinder with the outside (i.e., suction chamber and discharge chamber), and the flow passage is closed or opened by a suction valve or discharge valve. The opening and closing of the suction or discharge valve is performed by means of a difference between the cylinder pressure and the outside pressure, which results from the reciprocating motion of the piston.

Such suction or discharge valve opens and closes the flow passage at high rate during the operation of the compressor. Here, more specifically, a free-end tip portion of the suction or discharge valve opens and closes the flow passage of the valve plate. That is, the flow passage is closed when the tip portion of the suction or discharge valve comes into close contact with a valve seat of the valve plate, whereas the flow passage is opened when the tip portion of the suction or discharge valve is separated apart from the valve seat.

As described above, however, since the tip portions of the valves repeatedly strike the valve seat during the operation of the compressor so that the flow passage can be opened and closed, a large amount of noise is generated.

In the meantime, efficiency of the compressor is largely related to the valve apparatus. Energy loss in the compressor is influenced by the operation of the suction and discharge valves for opening and closing the flow passage formed in the valve plate.

As for the valve apparatus, factors having influence on the compressor efficiency include opening delay phenomena of the suction and discharge valves. One of the primary factors in such valve opening delay phenomena is inertia of the valves having various configurations and weights. The inertia is referred to as a tendency of causing the valve to maintain an original motion state. In particular, a state where the flow passage is closed by the valve is maintained at an initial stage when the valve is opened by means of the pressure difference of the working fluid from the state where the flow passage is closed by the valve, and thus, the valve opening is retarded.

The adhesive force resulting from viscous oil interposed between the valve and the valve seat of the valve plate can also cause the valve opening to be retarded. Further, inappropriate shapes of the valve seat and the flow passage formed in the valve plate can cause the opening delay phenomena to occur.

DISCLOSURE OF INVENTION

The present invention is contemplated to solve the aforementioned problems in the prior art. An object of the present invention is to minimize noise generated from a valve apparatus of the present invention during the operation of a compressor.

Another object of the present invention is to maximize efficiency of a compressor.

According to an aspect of the present invention for achieving the above objects, there is provided a valve apparatus for a hermetic compressor, comprising a valve plate which is installed on a leading end of a cylinder and which is provided with a penetrated flow passage for communicating the cylinder with the outside and causing working fluid to flow therethrough, a valve of which an end is securely seated on the valve plate to be fixed thereon and of which a free end allows the flow passage to be selectively opened and closed by pressure of the working fluid, and an elastic lead which is integrally formed in the valve and exerts elastic force on the valve in a direction that the valve is opened.

Preferably, the present invention further comprises a valve spring which is installed on the valve to control an opening degree of the valve and exerts elastic force on the valve in a direction that the valve is closed.

Further, the elastic lead may be formed by cutting out a portion of the valve and is then bent obliquely with respect to the valve such that an end of the elastic lead is supported on the valve plate.

The elastic lead may be formed such that the end thereof is directed to the free end of said valve.

The elastic lead may be formed such that the end thereof is directed to the fixed end of the valve.

The elastic lead may be formed at an intermediate portion of the valve.

The end of the elastic lead may include a contact portion which is bent to be in close contact with a surface of a recess formed in the valve plate.

According to another aspect of the present invention, there is provided a valve apparatus for a hermetic compressor, comprising a valve plate which is installed on a leading end of a cylinder and which is provided with a penetrated flow passage for communicating the cylinder with the outside and causing working fluid to flow therethrough, a valve of which an end is securely seated on the valve plate to be fixed thereon and of which a free end allows the flow passage to be selectively opened and closed by pressure of the working fluid, and an opening spring which is fixed on one side of the valve corresponding to a side opposite to the valve plate with respect to the valve, of which a tip portion passes through a central portion of the valve and is positioned between the valve and the valve plate, and which exerts elastic force on the valve in a direction that the valve is opened.

Preferably, the present invention further comprises a valve spring which is installed on the valve to control an opening degree of the valve and exerts elastic force on the valve in a direction that the valve is closed.

A cutout may be formed in an intermediate portion of the valve such that the opening spring passes through the cutout to be directed to a tip portion of the valve between a lower portion of the valve and the valve plate.

The opening spring may be constructed such that its one end is securely seated on the one side of the valve to be fixed together with the valve and its free end is mounted closely onto the other side of the valve between the valve and the valve plate, and that two portions thereof divided by a portion which passes through the cutout of the valve are formed stepwise.

A raised portion, which is higher than a valve seat positioned in the periphery of the flow passage in the valve plate, may be formed on a portion of the valve plate where the valve and the opening spring are clamped.

A recess may be formed on a portion in the valve plate corresponding to the tip portion of the opening spring.

According to the valve apparatus of the hermetic compressor of the present invention constructed as such, there are advantages in that the noise generated during the operation of the compressor can be minimized and the compressor efficiency can be improved.

BRIEF DESCRIPTION OF DRAWINGS

The above and other objects and features of the present invention will become apparent from the following description of preferred embodiments given in conjunction with the accompanying drawings, in which.

BEST MODE FOR CARRYING OUT THE INVENTION

Hereinafter, preferred embodiments of the present invention will be described in detail with reference to the accompanying drawings.

Figure 1:
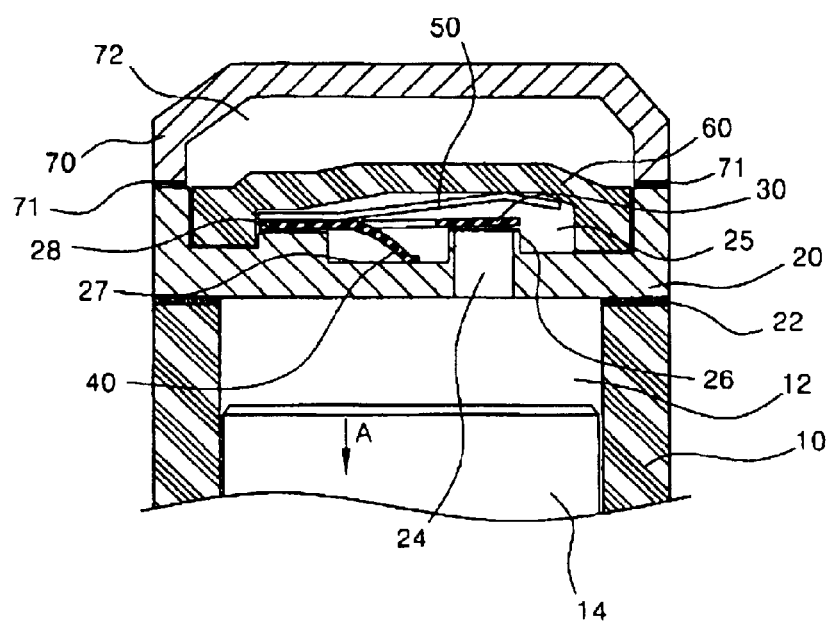
FIG. 1 is a sectional view showing the constitution of a valve apparatus of the hermetic compressor according to a preferred embodiment of the present invention.

Referring to FIG. 1, a compression chamber 12 in which compression of working fluid is performed is formed within a cylinder block 10. A reciprocating piston 14 is installed within the compression chamber 12. The piston 14 reciprocates linearly within the compression chamber 12 by means of driving force generated from a motor unit that is a component of the hermetic compressor.

A valve plate 20 is installed onto a leading end of the cylinder block 10. The valve plate 20 is mounted to the cylinder block 10 with a gasket interposed between the valve plate and a front face of the cylinder block 10. A flow passage 24, which is formed through the valve plate 20, has a function of communicating the compression chamber 12 with a discharge chamber 72 to be described later. The flow passage 24 perforates into a valve chamber 25 formed onto a side of the valve plate 20. The valve chamber 25 is a concave portion which is formed in the side of the valve plate 20 and in which parts for controlling a flow of the working fluid flowing through the flow passage 24 are provided.

A valve seat 26 is formed around a periphery of the flow passage 24 which is opened toward the valve chamber 25. The valve seat 26 is formed to be raised with respect to surrounding portions thereof and corresponds to a portion which is in contact with a discharge valve 30, to be described later, at the time of closing the flow passage 24.

In addition, a recess 27 is formed in a side of the valve chamber 25. A free end of an elastic lead 40 to be described later is located within the recess 27, and an end of the elastic lead 40 is in contact with a bottom surface of the recess 27. A raised portion 28 protruding higher than the other portions is also provided in the side of the valve chamber 25. It is preferred that the raised portion 28 be formed to protrude at the same height as the valve seat 26. Furthermore, a clamped portion 32 of the discharge valve 30 is positioned at the raised portion 28.

Figure 2:
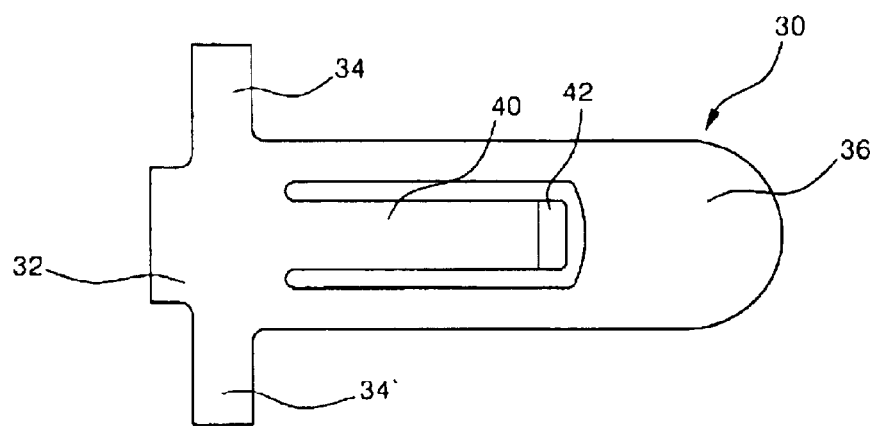
FIG. 2 is a plan view of a discharge valve used in the preferred embodiment of the present invention as shown in FIG. 1.

The discharge valve 30 is installed within the valve chamber 25. The discharge valve 30 causes the flow passage 24 to be opened and closed by means of a difference between pressures of the working fluid inside and outside the compression chamber 12, and is made of plate-like spring steel to have a predetermined length smaller than a width thereof as shown in FIG. 2. The clamped portion 32 corresponding to an end of the discharge valve 30 is securely seated onto the raised portion 28. Fixed wings 34, 34' are formed to extend from both lateral ends of the clamped portion 32. A free end 36 of the discharge valve 30 is a portion for causing the flow passage 24 to be opened and closed, and should have an area that can cover at least the periphery of the valve seat 26.

The elastic lead 40 is integrally formed at an intermediate portion of the discharge valve 30. The elastic lead 40 is formed by cutting away inner portions of the discharge valve 30 at a predetermined width in a longitudinal direction and is then bent so that it can exert elastic force on the discharge valve 30 in a direction that the discharge valve 30 opens. A contact portion 42 is formed at the end of the elastic lead 40 to be in close contact with the bottom surface of the recess 27. The contact portion 42, which is formed by further bending the end of the elastic lead 40, has a larger contact area with the bottom surface of the recess 27 so that the elastic lead 40 can have the more stable elasticity. Further, the contact portion 42 has a function of preventing wear of the recess 27 or the elastic lead 40. With the above constitution, the fixed end of the elastic lead 40 is connected to the discharge valve 30 while the contact portion 42 positioned at the free end thereof comes into contact with the bottom surface of the recess 27 in a state where the discharge valve 30 has been mounted within the valve chamber 25.

The elastic lead 40 exerts the elastic force on the discharge valve 30 to cause the discharge valve 30 to open so that the flow passage 24 can be opened, and thus, the elastic lead reduces the striking force that the discharge valve 30 imparts to the valve seat 26 and the opening/closing operation of the discharge valve 30 can be performed more smoothly. Furthermore, since the free end of the elastic lead 40 is in contact with the bottom surface of the recess 27, a state where the free end 36 of the discharge valve 30 is slightly separated apart from the valve seat 26 is kept at an ordinary times, i.e. when the compressor does not operate.

Moreover, a valve spring 50, which is made of the same material as the discharge valve 30 and has predetermined elasticity, is positioned on the discharge valve 30. The valve spring controls an opening degree of the discharge valve 30 and exerts elastic force on the discharge valve 30 in a direction that the discharge valve 30 causes the flow passage 24 to be closed so that the opening/closing operation of the discharge valve 30 can be smoothly performed. A free end of the valve spring 50 extends in a direction far away from a tip of the free end of the discharge valve 30.

A retainer 60 is used to clamp the discharge valve 30 and the valve spring 50 within the valve chamber 25. The retainer 60 is installed to push down clamped ends of the discharge valve 30 and the valve spring 50 in a state where they are press-fitted within the valve chamber 25.

In addition, a head cover 70 is mounted onto the valve plate 20. Of course, both the valve plate 20 and the head cover 70 are together fastened to the cylinder block 10 by means of bolts (not shown). The head cover 70 is fastened to the cylinder block with a gasket 71 for preventing leakage of the working fluid interposed between the head cover 70 and the valve plate 20. The discharge chamber 72 is formed between the valve plate 20 and the head cover 70. Of course, a suction chamber (not shown) is provided in one side between the head cover 70 and the valve plate 20. The suction chamber selectively communicates with the compression chamber 12 through a suction valve that is not shown in the figures.

Figure 3:
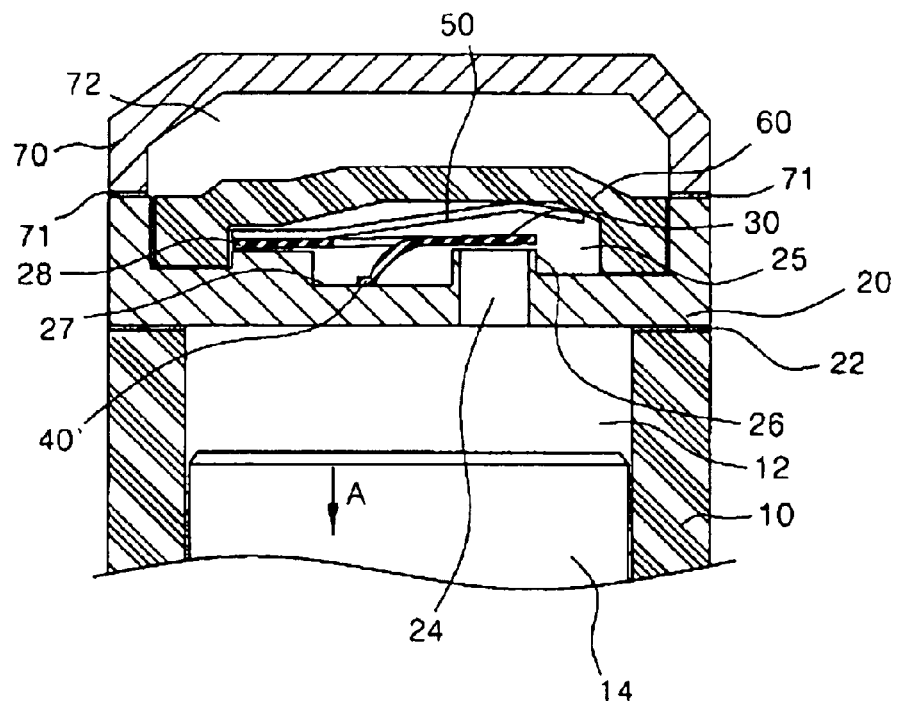
FIG. 3 is a sectional view showing the constitution of a valve apparatus according to another preferred embodiment of the present invention.
Figure 4:
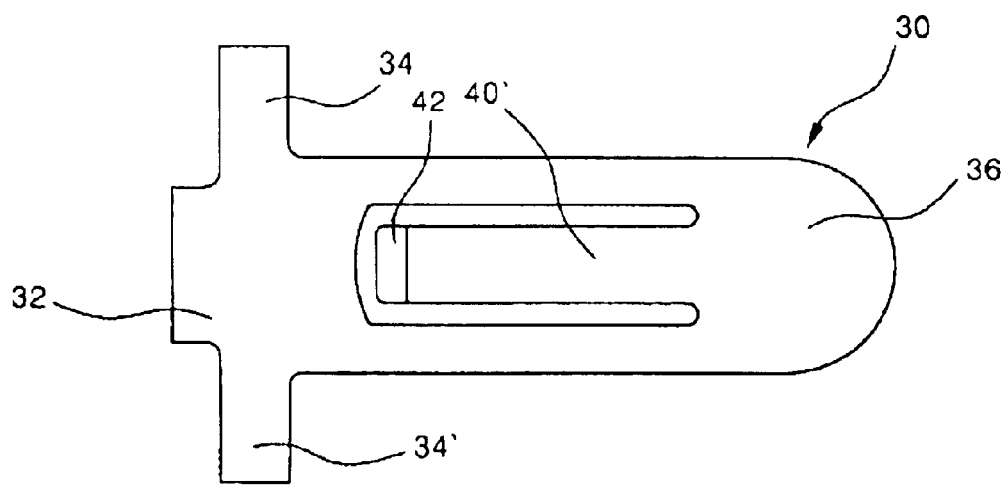
FIG. 4 is a plan view of a discharge valve used in the preferred embodiment of the present invention as shown in FIG. 3.

FIGS. 3 and 4 show another preferred embodiment of the present invention. In the preferred embodiment shown in these figures, an elastic lead 40' is formed at the discharge valve 30 in a direction opposite to that of the preferred embodiment shown in FIG. 2. That is, a free end of the elastic lead 40' is bent to face the clamped portion 32 of the discharge valve 30, and the contact portion 42 corresponding to the end of the elastic lead is supported on the bottom surface of the recess 27. In this embodiment, the elastic lead 40' exerts elastic force on the discharge valve 30 such that the discharge valve 30 can operate in a direction that the discharge valve 30 opens to allow the flow passage 24 to be opened.

Hereinafter, the operation of the valve apparatuses according to the preferred embodiments constructed as such will be explained.

First, according to the preferred embodiment shown in FIG. 1, when the piston 14 moves in a direction of an arrow A, negative pressure is generated within the compression chamber 12. Thus, the suction valve (not shown) opens, and then the working fluid within the suction chamber is introduced into the compression chamber 12. At this time, the discharge valve 30 overcomes the elastic force exerted on the discharge valve by the elastic lead 40 by means of the negative pressure generated within the compression chamber 12, and thus, it is in close contact with the valve seat 26. Therefore, the working fluid introduced into the compression chamber 12 cannot be discharged into the discharge chamber 72.

When the suction of the working fluid is completed as such, the piston 14 begins to move in a direction opposite to the arrow A and causes the working fluid within the Compression chamber 12 to be compressed. At this time, the suction valve is closed by means of the pressure generated within the compression chamber 12. Thereafter, as the working fluid is compressed, the pressure within the compression chamber 12 increases. Thus, the discharge valve 30 opens. The opening of the discharge valve 30 is performed depending on the difference between pressures of the compression chamber 12 and the discharge chamber 72.

The free end 36 of the discharge valve 30 is separated from the valve seat 26 by means of the pressure difference and the elastic force exerted on the discharge valve 30 by the elastic lead 40, and consequently, the flow passage 24 is opened. Thus, when the flow passage 24 is opened, the working fluid within the compression chamber 12 is discharged into the discharge chamber 72. Further, the opening degree of the discharge valve 30 is controlled by the valve spring 50, and the discharge valve 30 rapidly closes the flow passage 24 by means of the elastic force exerted by the valve spring 50 so that the next stroke of the piston can be performed. Here, since the piston 14 moves again in the direction of the arrow A, the discharge valve 30 is closed. Then, the working fluid is introduced into the compression chamber 12, and the aforementioned processes will be repeated.

On the other hand, the elastic lead 40 always exerts force on the discharge valve 30 in a direction that the flow passage 24 is opened. Therefore, when the free end 36 of the discharge valve 30 comes into contact with the valve seat 26 in order to close the flow passage 24, the elastic lead 40 reduces the striking force generated when the discharge valve 30 strikes the valve seat 26. Further, the elastic lead 40 exerts the elastic force on the discharge valve 30 even when the discharge valve 30 opens to allow the flow passage 24 to be opened. Thus, the elastic lead 40 allows the discharge valve 30 to be smoothly separated from the valve seat 26.

The operation of the valve apparatus according to the preferred embodiment shown in FIG. 3 is identical to that of FIG. 1.

Figure 5:
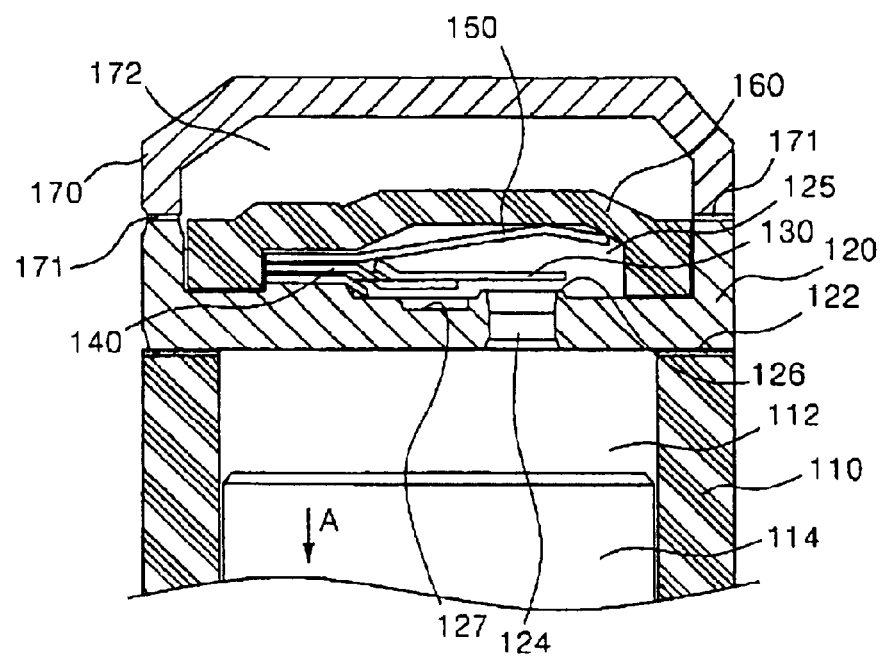
FIG. 5 is a sectional view showing the constitution of a valve apparatus according to a further preferred embodiment of the present invention.

Next, FIG. 5 shows a further preferred embodiment of the present invention. Referring to this figure, a compression chamber 112 in which compression of working fluid is performed is formed within a cylinder block 110. A reciprocating piston 114 is installed within the compression chamber 112. The piston 114 reciprocates linearly within the compression chamber 112 by means of driving force generated from a motor unit that is a component of the hermetic compressor.

A valve plate 120 is installed onto a leading end of the cylinder block 110. The valve plate 120 is mounted to the cylinder block 110 with a gasket 122 interposed between the valve plate and a front face of the cylinder block 110. A flow passage 124, which is formed through the valve plate 120, has a function of communicating the compression chamber 112 with a discharge chamber 172 to be described later. The flow passage 124 perforates into a valve chamber 125 formed onto a side of the valve plate 120. The valve chamber 125 is a concave portion which is formed in the side of the valve plate 120 and in which parts for controlling a flow of the working fluid flowing through the flow passage 124 are provided.

A valve seat 126 is formed around a periphery of the flow passage 124 which is opened toward the valve chamber 125. The valve seat 126 is formed to be raised with respect to surrounding portions thereof and corresponds to a portion which is in contact with a discharge valve 130 to be described later at the time of closing the flow passage 124.

In addition, a recess 127 is formed in a side of the valve chamber 125. An opening spring 140 to be described later is located within the recess 127 so as not to interfere with the valve plate 120. A raised portion 128 protruding higher than the other portions is also provided in the side of the valve chamber 125. The raised portion 128 is formed relatively higher than the valve seat 126. At this time, it is preferred that a height of the raised portion 128 be higher than the valve seat 126 by a thickness of the discharge valve 130 to be described hereinafter. Furthermore, a clamped portion 132 of the discharge valve 130 is positioned at the raised portion 128.

Figure 6A:
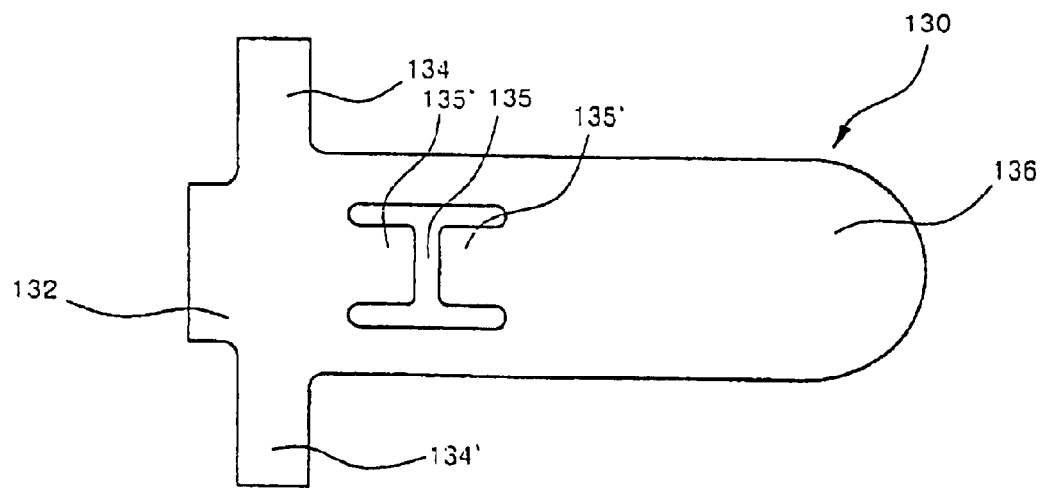
FIG. 6a is a plan view of a discharge valve used in the preferred embodiment of the present invention as shown in FIG. 5.
Figure 6B:
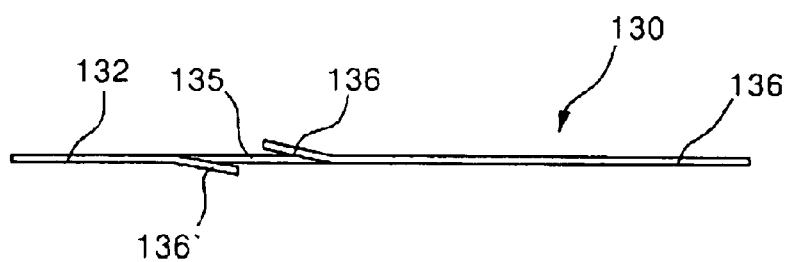
FIG. 6b is a sectional view of the discharge valve used in the preferred embodiment of the present invention as shown in FIG. 5.

The discharge valve 130 is installed within the valve chamber 125. The discharge valve 130 causes the flow passage 124 to be opened and closed by means of a difference between pressures of the working fluid inside and outside the compression chamber 112, and is made of plate-like spring steel to have a predetermined length smaller than a width thereof as shown in FIG. 6. The clamped portion 132 corresponding to an end of the discharge valve 130 is securely seated onto the raised portion 128. Fixed wings 134, 134' are formed to extend from both lateral ends of the clamped portion 132. A free end 136 of the discharge valve 130 is a portion for causing the flow passage 124 to be opened and closed, and should have an area that can cover at least the periphery of the valve seat 126.

A cutout portion 135 is formed at an intermediate portion of the discharge valve 130. The cutout portion 135 is formed by cutting out inner portions of the discharge valve 130 in a direction perpendicular to the longitudinal direction of the discharge valve 130, and louvers 135' that are bent to be staggered from each other are formed at both ends thereof. As shown well in FIG. 6b, the louvers 135' are extended toward the free end 136 and the clamped portion 132 of the discharge valve 130, respectively, in a manner that they are staggered from each other.

Figure 7A:
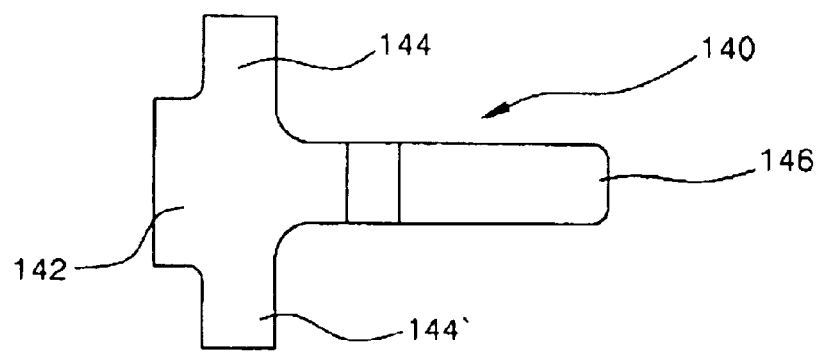
FIG. 7a is a plan view of an opening spring used in the preferred embodiment of the present invention as shown in FIG. 5.
Figure 7B:
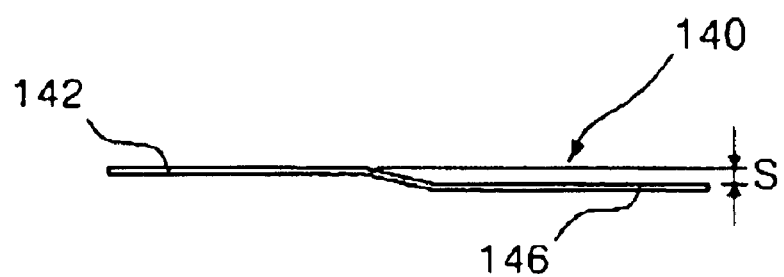
FIG. 7b is a sectional view of the opening spring used in the preferred embodiment of the present invention as shown in FIG. 5.

The opening spring 140 is mounted onto the clamped portion 132 of the discharge valve 130. As shown well in FIGS. 7a and 7b, the opening spring 140 includes a clamped portion 142 corresponding to the clamped portion 132 of the discharge valve 130. Fixed wings 144, 144' are formed at the clamped portion 142 to extend from both lateral ends thereof Such opening spring 140 is made of the same material as the discharge valve 130. A free end 146 corresponding to a portion opposite to the clamped portion 142 of the opening spring 140 is formed to have a step s corresponding to the thickness of the discharge valve 132 with respect to the clamped portion 142. That is, the free end 146 is formed to be lower than the clamped portion 142.

Therefore, the clamped portion 142 of the opening spring 140 is positioned onto the clamped portion 132 of the discharge valve 130, whereas the free end 146 of the opening spring is contacted with and positioned on a side of the discharge valve 130 that faces toward the valve plate 120. The opening spring 140 exerts elastic force on the discharge valve 130 in a direction that the discharge valve 130 is opened. Thus, the opening spring 140 causes the discharge valve 130 to be opened more smoothly, and also has a function of reducing striking noise generated when the discharge valve 130 comes into contact with the valve seat 120.

Furthermore, a valve spring 150, which is made of the same material as the discharge valve 130 and has predetermined elasticity, is positioned on the discharge valve 130. The valve spring 150 controls an opening degree of the discharge valve 130 and exerts elastic force on the discharge valve 130 in a direction that the discharge valve 130 causes the flow passage 124 to be closed so that the opening/closing operation of the discharge valve 130 can be smoothly performed. A free end of the valve spring 150 extends in a direction far away from a tip of the free end 136 of the discharge valve 130.

A retainer 160 is used to clamp the discharge valve 130, the opening spring 140 and the valve spring 150 within the valve chamber 125. The retainer 160 is installed to push down the clamped portions 132, 142 of the discharge valve 130, the opening spring 140 and the valve spring 150 in a state where they are press-fitted within the valve chamber 125.

In addition, a head cover 170 is mounted onto the valve plate 120. Of course, both the valve plate 120 and the head cover 170 are together fastened to the cylinder block 110 by means of bolts (not shown). The head cover 170 is fastened to the cylinder block with a gasket 171 for preventing leakage of the working fluid interposed between the head cover 170 and the valve plate 120. The discharge chamber 172 is formed between the valve plate 120 and the head cover 170. Of course, a suction chamber (not shown) is provided in one side between the head cover 170 and the valve plate 120. The suction chamber selectively communicates with the compression chamber 112 through a suction valve that is not shown in the figures.

Hereinafter, the operation of the valve apparatuses according to the preferred embodiments constructed as such will be explained. Referring to FIG. 5, when the piston 114 moves in a direction of an arrow A, negative pressure is generated within the compression chamber 112. Thus, the suction valve (not shown) opens, and then, the working fluid within the suction chamber is introduced into the compression chamber 112. At this time, the discharge valve 130 overcomes the elastic force exerted by the opening spring 140 by means of the negative pressure generated within the compression chamber 112, and thus, it is in close contact with the valve seat 126. Therefore, the working fluid introduced into the compression chamber 112 cannot be discharged into the discharge chamber 172.

When the suction of the working fluid is completed as such, the piston 114 begins to move in a direction opposite to the arrow A and causes the working fluid within the compression chamber 112 to be compressed. At this time, the suction valve is closed by means of the pressure generated within the compression chamber 112. Thereafter, as the working fluid is compressed, the pressure within the compression chamber 112 increases. Thus, the discharge valve 130 opens. At this time, the opening of the discharge valve 130 is performed depending on the difference between pressures of the compression chamber 112 and the discharge chamber 172.

The free end 136 of the discharge valve 130 is separated from the valve seat 126 by means of the pressure difference and the elastic force exerted by the opening spring 140, and the flow passage 124 is consequently opened. Thus, when the flow passage 124 is opened, the working fluid within the compression chamber 112 is discharged into the discharge chamber 172. Further, the opening degree of the discharge valve 130 is controlled by the valve spring 150, and the discharge valve 130 is rapidly closed to allow the flow passage 124 to be closed by means of the elastic force exerted by the valve spring 150 so that the next stroke of the piston can be performed. Here, since the piston 114 moves again in the direction of the arrow A, the discharge valve 130 is closed. Then, the working fluid is introduced into the compression chamber 112, and the aforementioned processes will be repeated.

On the other hand, the opening spring 140 always exerts force on the discharge valve 130 in a direction that the flow passage 124 is opened. Therefore, when the free end 136 of the discharge valve 130 comes into contact with the valve seat 126 to allow the flow passage 124 to be closed, the opening spring 140 reduces the striking force generated when the discharge valve 130 strikes the valve seat 126. Further, the opening spring 140 exerts the elastic force on the discharge valve 130 even when the discharge valve 130 opens to allow the flow passage 124 to be opened, and thus, the opening spring 140 allows the discharge valve 130 to be smoothly separated from the valve seat 126.

Although it has been described in the preferred embodiments of the present invention that the valve apparatus of the present invention is applied to the discharge valve, it is apparent to a person skilled in the art that the valve apparatus of the present invention may be applied to the suction valve.

Industrial Applicability

As described above, the valve apparatus of the hermetic compressor according to the present invention includes the elastic lead or opening spring that exerts the elastic force on the valve in a direction that the valve is opened. Thus, the opening/closing operation of the valve can be smoothly performed and the striking noise generated when the valve strikes the valve seat can also be minimized. Accordingly, efficiency of the compressor can be improved, and simultaneously, operating noise thereof can be minimized.

Further, according to the present invention, the elastic lead, which can exert the elastic force on the valve in a direction that the valve is opened, is integrally formed at the valve. Therefore, there is an advantage in that the constitution of the valve apparatus can be relatively simplified. Alternatively, the opening spring manufactured independently from the valve can also be supplied to an assembling line in a state where the opening spring is temporarily assembled with the valve. Therefore, there is an advantageous effect in that efficiency of the work of assembling the valve can be improved.

While the invention has been shown and described with respect to the preferred embodiments, it will be understood by those skilled in the art that various changes and modifications can be made without departing from the spirit and scope of the invention as defined in the appended claims.

What is claimed is:

1. A valve apparatus for a hermetic compressor, comprising:
   a valve plate which is installed on a leading end of a cylinder and which is provided with a penetrated flow passage for communicating said cylinder with the outside and causing working fluid to flow therethrough;
   a valve of which an end is securely seated on said valve plate to be fixed thereon and of which a free end allows said flow passage to be selectively opened and dosed by pressure of said working fluid; and
   an elastic lead which is integrally formed in said valve and exerts elastic force on said valve in a direction that said valve is opened, and wherein said elastic lead is formed by cutting out a portion of said valve, and wherein said portion is then bent obliquely with respect to said valve such that an end of said elastic lead is supported on said valve plate.

2. The valve apparatus as claimed in claim 1, further comprising a valve spring which is installed on said valve to control an opening degree of said valve and exerts elastic force on said valve in a direction that said valve is closed.

3. The valve apparatus as claimed in claim 1, wherein said elastic lead is formed such that said end thereof is directed to said free end of said valve.

4. The valve apparatus as claimed in claim 1, wherein said elastic lead is formed such that said tip portion thereof is directed to said fixed end of said valve.

5. The valve apparatus as claimed in claim 3, wherein said elastic lead is formed at an intermediate portion of said valve.

6. The valve apparatus as claimed claim 5, wherein said end of said elastic lead includes a contact portion which is bent to be in close contact with a surface of a recess formed in said valve plate.

7. A valve apparatus for a hermetic compressor, comprising:
   a valve plate which is installed on a leading end of a cylinder and which is provided with a penetrated flow passage for communicating said cylinder with the outside and causing working fluid to flow therethrough;
   a valve of which an end is securely seated on said valve plate to be fixed thereon and of which a free end allows said flow passage to be selectively opened and closed by pressure of said working fluid; and
   an opening spring which is fixed on one side of said valve corresponding to a side opposite to said valve plate with respect to said valve, of which a tip portion passes through a central portion of said valve and is positioned between said valve and said valve plate, and which exerts elastic force on said valve in a direction that said valve is opened.

8. The valve apparatus as claimed in claim 7, further comprising a valve spring which is installed on said valve to control an opening degree of said valve and exerts elastic force on said valve in a direction that said valve is closed.

9. The valve apparatus as claimed in claim 7, wherein a cutout is formed in an intermediate portion of said valve such that said opening spring passes through said cutout to be directed to a tip portion of said valve between a lower portion of said valve and said valve plate.

10. The apparatus as claimed in claim 9, wherein said opening spring is constructed such that its one end is securely seated on said one side of said valve to be fixed together with said valve and its free end is mounted closely onto the other side of said valve between said valve and said valve plate, and that two portions thereof divided by a portion which passes through said cutout of said valve are formed stepwise.

11. The valve apparatus as claimed in claim 7, wherein a raised portion, which is higher than a valve seat positioned in the periphery of said flow passage in said valve plate, is formed on a portion of said valve plate where said valve and said opening spring are clamped.

12. The apparatus as claimed in claim 11, wherein a recess is formed on a portion in said valve plate corresponding to said tip portion of said valve spring.

13. A valve apparatus for a hermetic compressor, comprising:
   a valve plate provided with a flow passage for working fluid to flow therethrough;
   a valve having one end secured to the valve plate and an opposite free end selectively opening and closing the flow passage; and
   an elastic lead formed by cutting out a portion of the valve, wherein the cut out portion has a first end that is integral with the valve and a second end having a tip that is supported on the valve plate.

14. The valve apparatus of claim 13, wherein the second end of the elastic lead is bent and flatly contacts the valve plate.

15. The valve apparatus of claim 13, wherein the second end of the elastic lead is positioned inside a recess formed in the valve plate.

16. The valve apparatus of claim 15, wherein the tip contacts a surface of the recess.

17. The valve apparatus of claim 13, wherein the first end of the elastic lead is integral with the one secured end of the valve.

18. The valve apparatus of claim 13, wherein the first end of the elastic lead is integral with the free end of the valve.

19. The apparatus of claim 13, wherein the elastic lead is formed at an intermediate portion of the valve.

20. The valve apparatus of claim 4, wherein the elastic lead is bent obliquely with respect to the valve.

* * * * *